United States Patent
Kajiwara

[19]

[11] Patent Number: 6,028,963
[45] Date of Patent: Feb. 22, 2000

[54] IMAGE ENCODING BASED ON JUDGEMENT ON PREDICTION ERROR

[75] Inventor: Hiroshi Kajiwara, Inagi, Japan

[73] Assignee: Canon Kabushiki Kaisha, Tokyo, Japan

[21] Appl. No.: 08/874,581

[22] Filed: Jun. 13, 1997

[30] Foreign Application Priority Data

Jun. 17, 1996 [JP] Japan .................................. 8-155501
Jun. 17, 1996 [JP] Japan .................................. 8-155502

[51] Int. Cl.[7] .............................. G06K 9/36; H04N 7/12; H03M 7/34
[52] U.S. Cl. .......................... 382/239; 382/238; 382/236; 348/400; 341/51
[58] Field of Search .................................... 382/239, 238, 382/232, 236, 234; 358/162.1; 348/409, 415, 400; 341/51, 65

[56] References Cited

U.S. PATENT DOCUMENTS

| | | | |
|---|---|---|---|
| 4,363,036 | 12/1982 | Subramaniam | 358/261.2 |
| 4,749,983 | 6/1988 | Langdon, Jr. | 341/51 |
| 5,471,207 | 11/1995 | Zandi et al. | 341/107 |
| 5,680,129 | 10/1997 | Weinberger et al. | 341/65 |
| 5,761,342 | 6/1998 | Yoshida | 283/234 |
| 5,764,374 | 6/1998 | Seroussi et al. | 382/238 |
| 5,764,804 | 6/1998 | Yajima et al. | 382/238 |

FOREIGN PATENT DOCUMENTS

| | | | |
|---|---|---|---|
| 8130649 | 5/1996 | Japan | H04N 1/41 |
| 8298599 | 11/1996 | Japan | H04N 1/41 |
| 8331389 | 12/1996 | Japan | H04N 1/41 |
| 9009264 | 1/1997 | Japan | H04N 7/32 |
| 9037246 | 2/1997 | Japan | H04N 7/24 |

*Primary Examiner*—Thomas D. Lee
*Assistant Examiner*—Wenpeng Chen
*Attorney, Agent, or Firm*—Fitzpatrick Cella Harper & Scinto

[57] ABSTRACT

There is provided an image encode apparatus which comprises a generation means for generating a prediction error from an encode target pixel value and a prediction value of the encode target pixel value, a judgment means for generating a generation frequency distribution of the prediction error to judge whether or not the generation frequency distribution is discrete and an entropy encode means for changing encode data corresponding to the prediction error and performing entropy encoding on the obtained encode data, in accordance with a judged result by the judgment means. Therefore, the encoding can be effectively performed even on such the image data having the discrete pixel value as in a CG image, a limited-color image or the like.

13 Claims, 10 Drawing Sheets

| SYMBOL | CODE |
|---|---|
| 255 | 1 1 1 1 · · · · 1 1 1 0 |
| 254 | 1 1 1 1 · · · · 1 1 0 0 |
| . | . |
| . | . |
| . | . |
| 3 | 1 1 1 0 0 |
| 2 | 1 1 0 0 |
| 1 | 1 0 0 |
| 0 | 0 0 |
| -1 | 0 1 |
| -2 | 1 0 1 |
| -3 | 1 1 0 1 |
| . | . |
| . | . |
| . | . |
| -254 | 1 1 1 1 · · · · 1 1 0 1 |
| -255 | 1 1 1 1 · · · · 1 1 1 1 |

FIG. 5

| PREDICTION ERROR e | COUNT VALUE F(e) (TIMES) |
|---|---|
| 255 | 0 |
| 254 | 0 |
| . | . |
| . | . |
| . | . |
| 6 | 31 |
| 5 | 0 |
| 4 | 98 |
| 3 | 0 |
| 2 | 325 |
| 1 | 0 |
| 0 | 1080 |
| -1 | 0 |
| -2 | 298 |
| -3 | 0 |
| -4 | 102 |
| -5 | 0 |
| -6 | 30 |
| . | . |
| . | . |
| . | . |
| -254 | 0 |
| -255 | 0 |

FIG. 6

| INPUT VALUE (PREDICTION ERROR e) | INTERMEDIATE OUTPUT VALUE M(e) |
|---|---|
| 255 | 255 |
| 254 | 254 |
| . | . |
| . | . |
| . | . |
| 6 | 3 |
| 5 | Np+2 |
| 4 | 2 |
| 3 | Np+1 |
| 2 | 1 |
| 1 | Np |
| 0 | 0 |
| -1 | -Nm-1 |
| -2 | -1 |
| -3 | -Nm-2 |
| -4 | -2 |
| -5 | -Nm-3 |
| -6 | -3 |
| . | . |
| . | . |
| . | . |
| -254 | -254 |
| -255 | -255 |

FIG. 8

| CONTEXT S | Golomb-Rice PARAMETER k |
|---|---|
| 0 | 0 |
| 1 | 1 |
| 2 | 4 |
| 3 | 1 |
| 4 | 3 |
| 5 | 5 |
| 6 | 2 |
| 7 | 5 |
| 8 | 6 |

FIG. 9

| DIFFERENTIAL VALUE (a−c), (b−c) | QUANTIZATION VALUE q(a−c), q(b−c) |
|---|---|
| 4 · · · · | 2 |
| 3 | 1 |
| 2 | 1 |
| 1 | 1 |
| 0 | 0 |
| -1 | 1 |
| -2 | 1 |
| -3 | 1 |
| -4 · · · · | 2 |

FIG. 10

| SYMBOL (INTERMEDIATE OUTPUT VALUE) e' | k = 0 | k = 1 | k = 2 |
|---|---|---|---|
| 0 | 1 | 0 1 | 0 0 1 |
| 1 | 0 1 | 1 1 | 0 1 1 |
| 2 | 0 0 1 | 0 0 1 | 1 0 1 |
| 3 | 0 0 0 1 | 1 0 1 | 1 1 1 |
| 4 | 0 0 0 0 1 | 0 0 0 1 | 0 0 0 1 |
| 5 | 0 0 0 0 0 1 | 1 0 0 1 | 0 1 0 1 |
| ⋮ | ⋮ | ⋮ | ⋮ |

IMAGE ENCODING BASED ON JUDGEMENT ON PREDICTION ERROR

BACKGROUND OF THE INVENTION

1. Field of the Invention

The present invention relates to image encoding apparatus and method for encoding image data, and to a medium in which the image encoding method has been stored.

2. Related Background Art

Conventionally, in order to provide an image process apparatus, there has been a technique which is based on prediction encoding. The prediction encoding is achieved by using a series conversion unit for converting image data into a prediction error in prediction converting, and an entropy encoding unit for converting the prediction error outputted from the series conversion unit into code data of which redundancy is more smaller by using an entropy encoding method such as Huffman encoding or the like.

In the prediction encoding, a characteristic in a frequency of occurrence (or generation) of the prediction error is difference for each image. Therefore, in order to improve encoding efficiency, it is desired to perform optimum entropy encoding for each image.

As a method to achieve such entropy encoding, a method is well known in which an encoding process is performed on the basis of two-path structure. In this method, the characteristic in the frequency of occurrence of the prediction error is checked and detected in a first path, the entropy encoding method is determined according to the detected characteristic, and then practical encoding is performed in a second path.

However, it has been rare to use this method because the process becomes complicated, use of a memory increases, and the like. Instead, it has been more frequent to determine the entropy encoding method in accordance with a characteristic of general prediction error series.

In this case, by previously encoding the several images, the characteristic in the frequency of occurrence of the prediction error is detected and then the encoding method is determined based on the detected characteristic.

FIG. 2 shows an example of an image encoding apparatus in the above-described conventional system. In the drawing, reference numeral 201 denotes a buffer, 202 denotes a predictor, 203 denotes a subtracter, 204 denotes a memory, 205 denotes a Huffman encoder, and 206 and 207 denote signal lines.

Also, FIG. 2 shows the example of the image encoding apparatus which performs the prediction encoding by using peripheral pixels as a series converting process which converts the image data into the prediction error, and further performs the Huffman encoding as the encoding process.

In FIG. 2, before the encoding is practically performed, a frequency distribution of the prediction error which has been previously obtained by series-converting the image data representing the several images is checked, and then a Huffman table is formed and stored in the memory 204 in accordance with the checked frequency distribution.

In the case of practically performing the encoding, initially image data x is sequentially inputted from the signal line 206. The buffer 201 stores the image data x inputted from the signal line 206, by two lines. The predictor 202 derives, from the buffer 201, the image data of pixel a positioned immediately before an encoding target pixel and the image data of pixel b positioned before the pixel a by one line (see FIG. 3). Then, the predictor 202 generates a prediction value p by calculating p=(a+b)/2.

The subtracter 203 outputs a differential value e between the image data x of the encoding target pixel and the prediction value p. As described above, the Huffman encoder 205 outputs encoding data corresponding to the differential value e from the signal line 207, by referring to the Huffman table previously stored in the memory 204.

On the other hand, compressing efficiency in the prediction encoding depends on prediction accuracy in the series conversion unit and the encoding method in the entropy encoding unit. In order to improve the prediction accuracy, there is a technique which is so-called an error feedback. In the error feedback, the prediction error corresponding to the difference between an encoding target pixel value and the prediction value is used by the predictor as feedback to correct the prediction error.

For example, there is a method in which a mean value of the prediction error is calculated for each state on the basis of the state of the pixel values of the peripheral pixels of the encoding target pixel, and the calculated mean value is added to the prediction value. By using such the method, the prediction accuracy can be improved (such that numerous "0" of which code lengths are short are generated as the prediction errors), and also entropy can be reduced.

In the image encoding apparatus according to the above-described conventional system, in a case where the image data of such an image, e.g., a CG (computer graphics) image, a limited-color image or the like, as discretely having the pixel value is encoded, it is possible that the frequency of occurrence (or generation) of the prediction error after the above-described series conversion was performed becomes discrete.

In such the case, although the short code length has been allocated as the code length by the entropy encoding, the prediction error which is hardly generated or is not at all generated comes to exist. Therefore, there has been a problem that the compression efficiency is not improved.

On the other hand, in the conventional image process apparatus which utilizes the above-described error feedback, in the case where the data of the image, i.e., the CG image, the limited-color image or the like, consisting of the discrete pixel value is subjected to the entropy encoding, there is some fear that good compression performance can not be obtained.

Hereinafter, this case will be concretely explained.

In case of using simple prediction which does not include division such as pre-predicting, plane predicting or the like, if the error feedback is not used, the prediction error which has been generated from the data of the image consisting of the discrete pixel values has the discrete frequency distribution as shown in FIG. 11A.

However, in the case where the error feedback process is added, the prediction error which is essentially generated discretely is diffused to the prediction error of the peripheral value, whereby the frequency distribution as shown in FIG. 11B appears.

In this case, the entropy becomes larger as compared with the case where the error feedback process is not performed, whereby there is a problem that an encode data quantity dependent on the entropy encoding successively performed becomes larger.

That is, there has been a problem that, if the error feedback process for increasing the compression efficiency by reducing the entropy is performed for the image data of which entropy is originally low, the process increases the entropy instead.

SUMMARY OF THE INVENTION

The present invention has been made in consideration of the above-described problems, and an object of the present invention is to effectively encode even image data having such a discrete pixel value as seen in a CG image, a limited-color image or the like.

In order to achieve the above-described object, in accordance with a first preferred embodiment of the present invention, it is provided an image encoding apparatus comprising:

generation means for generating a prediction error from an encoding target pixel value and a prediction value of the encoding target pixel value;

judgment means for generating a generation frequency distribution of the prediction error to judge whether or not the generation frequency distribution is discrete; and entropy encoding means for changing encoding data corresponding to the prediction error and performing entropy encoding on the obtained encoding data, in accordance with a judged result by said judgment means.

Further, in order to achieve the above-described object, in accordance with an another preferred embodiment of the present invention, it is provided an image encoding apparatus comprising:

generation means for predicting a pixel value of an encoding target pixel and generating a prediction value;

prediction value correction means for correcting the prediction value; and judgment means for judging whether or not an image consisting of the plurality of encoding target pixels is composed of the discrete pixel values, wherein the correction by said prediction value correction means is controlled in accordance with a result of the judgment by the judgment means.

The above and other objects of the present invention will become apparent from the following detailed description when read in conjunction with the accompanying drawings.

BRIEF DESCRIPTION OF THE DRAWINGS

FIG. 5 is a view showing an example of count value held in a counter 105;

FIG. 6 is a view showing an example of a conversion table stored in a memory 111;

FIG. 8 is a view showing a correspondence table between a context S and a parameter k stored in a memory 707;

FIG. 9 is a view showing a quantizing method of differential values (a–c) and (b–c) between peripheral pixels;

FIG. 10 is a view showing a code table of Golomb-Rice encoding;

DETAILED DESCRIPTION OF THE PREFERRED EMBODIMENTS (First Embodiment)

Hereinafter, the present invention will be explained in detail with reference to the accompanying drawings.

Figure 1:
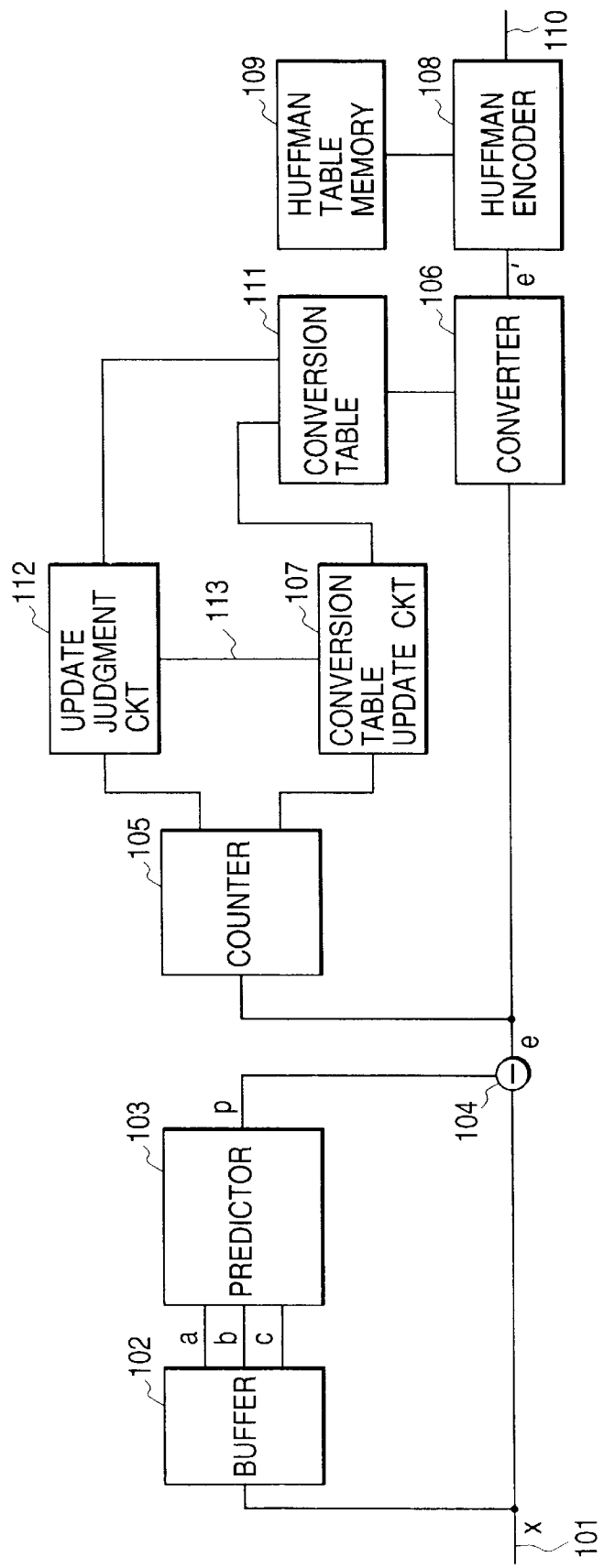
FIG. 1 is a block diagram showing a first embodiment of the present invention.
Figure 2:
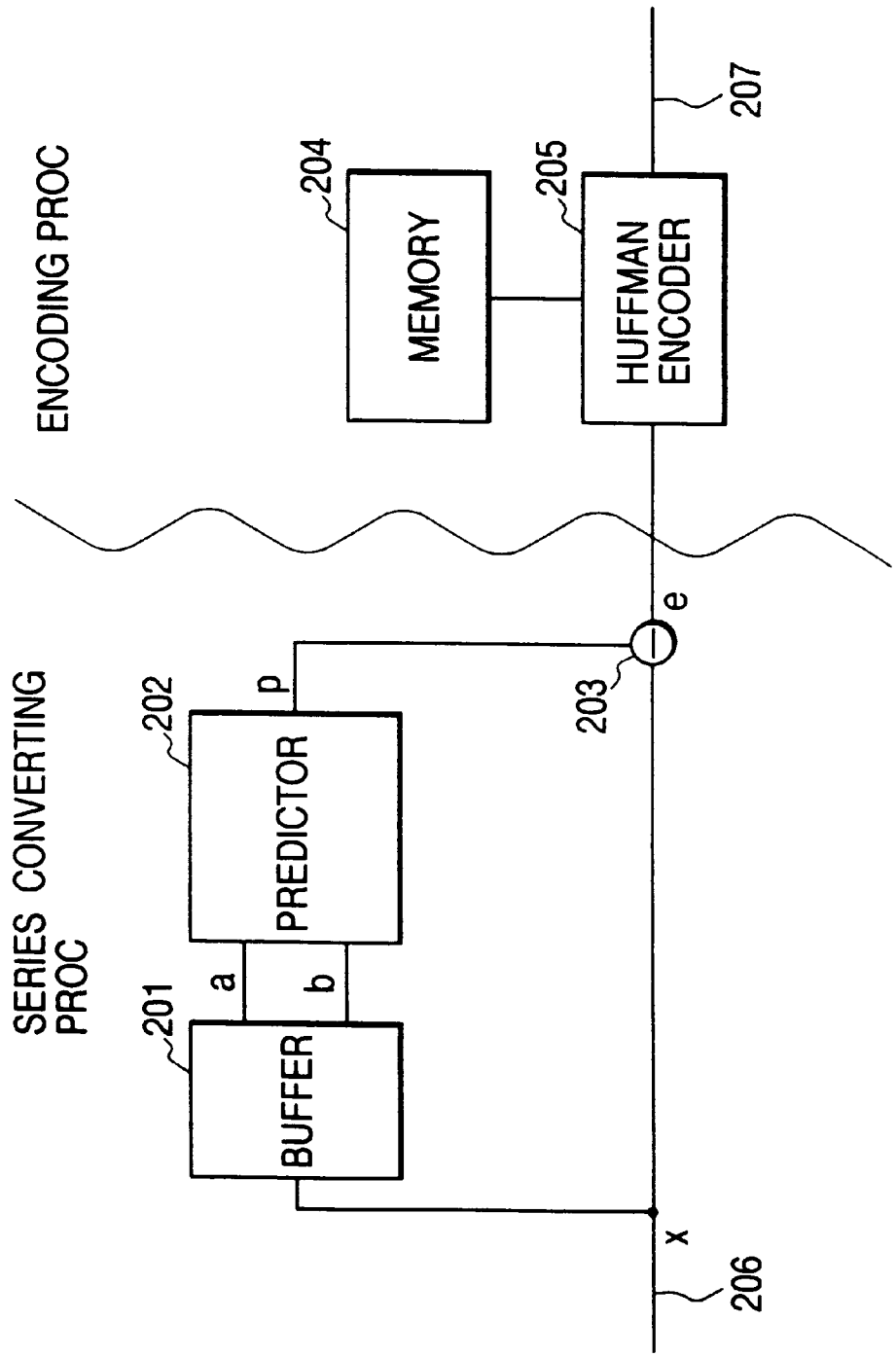
FIG. 2 is a block diagram showing a conventional image process apparatus.

FIG. 1 is a block diagram showing the first embodiment of the present invention. In FIG. 1, reference numeral 101 denotes a signal line, 102 denotes a buffer which stores image data corresponding to two lines, 103 denotes a predictor which generates a prediction value from peripheral pixels, 104 denotes a subtracter, 105 denotes a counter which holds the number F(e) of appearance of each prediction error e (=−255 to 255), 106 denotes a converter which outputs an intermediate output value e' corresponding to the prediction error e, 107 denotes a conversion table update circuit, 108 denotes a Huffman encoder, 109 denotes a memory which stores a Huffman table, 110 denotes a signal line, 111 denotes a memory (to be referred as conversion table 111 hereinafter) which stores a conversion table in which an output value M(i) for an input value i of the converter 106 has been defined, 112 denotes an update judgment circuit which judges whether or not the conversion table is to be updated, and 113 denotes a signal line.

The present embodiment will be explained by way of example that an eight-bit (i.e., 0 to 255 values) monochrome image is encoded. However, the present invention is not restricted to such a case, but may be applied to a case where each of RGB eight-bit signals is encoded for each of RGB color images.

Figures 3, 4:
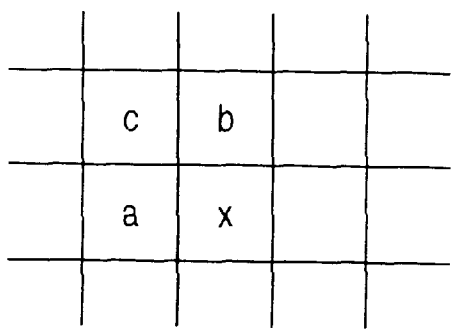
FIG. 3 is a view showing positions of peripheral pixels a, b and c for an encode target pixel x.
FIG. 4 is a view showing an example of a Huffman table stored in a memory 109.

It has been previously stored in the memory 108 the Huffman table which was formed on the basis of characteristics of the prediction errors generated in case of prediction-encoding several sample images. FIG. 4 shows an example of the Huffman table which has been stored in the memory 108.

Further, as an initial stage, the conversion table 111 has been set such that the output value M(i) for the input value i satisfies M(i)=i. Also, in the counter 105, all the values (i.e., the number of appearance) F(e) corresponding to the prediction errors e (=−255 to 255) have been set as "0".

Subsequently, an operation of each unit in the present embodiment will be explained sequentially.

Initially, an encoding target pixel x is inputted, in the order of raster scanning, into the buffer 102 and the subtracter 104 through the signal line 101.

The buffer 102 stores the signal which is inputted from the signal line 101 and corresponds to the two lines. Then, the predictor 103 reads peripheral pixels a, b and c of the encoding target pixel x from the buffer 102, and obtains a prediction value p for the encode target pixel x by calculating p=a+b−c. In this case, positions of the peripheral pixels a, b and c for the encoding target pixel x are shown in FIG. 3.

The subtracter 104 generates the prediction error e by calculating e=x−p and also performs increment of the counter value F(e). For example, if the prediction error is "2", the subtracter 104 performs the increment of the counter value F(2) corresponding to such the prediction error "2".

The converter 106 outputs the intermediate output value e' corresponding to the inputted prediction error e, by referring to the conversion table 111.

Processing operations of the update judgment circuit 112, the conversion table update circuit 107 and the conversion table 111 will be explained later.

The Huffman encoder 108 outputs encoding data corresponding to the intermediate output value e' to the signal line 110, by referring to the Huffman table stored in the Huffman table memory 109.

The above-described serial encoding process is repeatedly performed for the 16-line pixels of the inputted image data.

Subsequently, processes of the counter 105 and the update judgment circuit 112 will be explained in detail.

When the encoding process of 16 lines terminated, in the counter 105, data representing the number of appearance of each prediction error e is generated as shown in FIG. 5.

The update judgment circuit 112 checks the number (F(−Th) to F(Th)) of appearance of the prediction error (−Th to Th) (it is assumed that Th=32 in the present embodiment), in the counter values held in the counter 105.

If there is the value "0" as the number of appearance in the counter values, the update judgment circuit 112 judges that the objective image is a specific image (i.e., a CG image, a limited-color image or the like) in which the prediction error not generated exists. Thus, the circuit 112 outputs to the signal line 113 a control signal "1" for operating the conversion table update circuit 107. On the other hand, if there is no prediction error having the value "0" as the number of appearance in the 16 lines, the objective image is encoded as an ordinary image. Therefore, the update judgment circuit 112 outputs to the signal line 113 a signal "0" not for operating the conversion table update circuit 107. In this case, it is judged whether or not the objective image is the specific image, on the basis of the prediction error generated in the 16 lines of the image. However, the present invention is not restricted to such an operation. That is, the prediction error can be adaptively changed within a range beginning from the several pixels to the plurality of images, if in unit of image suitable for the judging.

In the example shown in FIG. 5, since the number of appearance for the prediction errors 1, −1, 3, −3, 5, −5 and the like is "0", the control signal "1" is outputted from the counter 105 to the conversion table update circuit 107.

Further, the counter 105 and the conversion table 111 are reset to an initial state for every 16 lines, and the processes of the counter 105 and the update judgment circuit 112 are repeated.

Then, an operation of the conversion table update circuit 107 will be explained in detail, hereinafter.

The conversion table update circuit 107 operates in the case where the control signal from the signal line 113 is "1", to perform a process for rewriting the conversion table 111. If the circuit does not perform the operation, the conversion table 111 is successively used.

The circuit 107 checks the number Np of the prediction error e of which the number of appearance is not "0", by referring to the number of appearance within the range of the prediction error e from "0" to "255" in the counter 105.

Then, the circuit 107 allocates the prediction error e of which the number of appearance is not "0" to integer values "0" to "Np−1" of an intermediate output value M(e) held in the conversion table 111, in the order of "0", "1", "2", "3" to "255" (i.e., "0", "2", "4", "6", . . . in FIG. 5).

Subsequently, the circuit 107 sequentially allocates the prediction error e of which the number of appearance is "0" (i.e., "1", "3", "5", . . . in FIG. 5), to the integer values "Np" to "255" of the intermediate output value M(e).

In the same manner as described above, the circuit 107 checks the number Nm of the prediction error e of which the number of appearance is not "0", for the prediction error e from "−1" to "−255".

Further, the circuit 107 allocates the prediction error e of which the number of appearance is not "0" to the integer values "−1" to "−Nm" of the intermediate output value M(e) held in the conversion table 111, in the order of "−1", "−2", "−3" to "−255" (i.e., "−2", "−4", "−6", . . . in FIG. 5).

Subsequently, the circuit 107 sequentially allocates the prediction error of which the number of appearance is "0" (i.e., "−1", "−3", "−5", . . . in FIG. 5), to the integer values "−Nm−1" to "−255" of the intermediate output value M(e).

By such operations, the conversion table 111 is rewritten such that the prediction errors of which frequency of generation is high concentrate on the value close to the intermediate output value "0" of which code length is short. Therefore, in the case where the objective image is judged as the specific image by the update judgment circuit 112, the value having large absolute value is allocated to the prediction error which is never generated, whereby the effective entropy encoding can be performed.

For an image having the generation frequency of the prediction error as shown in FIG. 5, the conversion table 111 is rewritten as shown in FIG. 6. When the rewriting of the conversion table 111 by the conversion table update circuit 107 terminates, all the count values held in the counter 105 are reset to "0".

As described above, the encoding process for the image data of the 16 lines and the updating of the conversion table 111 are repeatedly performed, the encoding is continuously performed for the final pixel inputted from the signal line 101, and then the encoding data is outputted to the signal line 110.

(Second Embodiment)

Subsequently, the second embodiment of the present invention will be explained with reference to the accompanying drawings.

Figure 7:
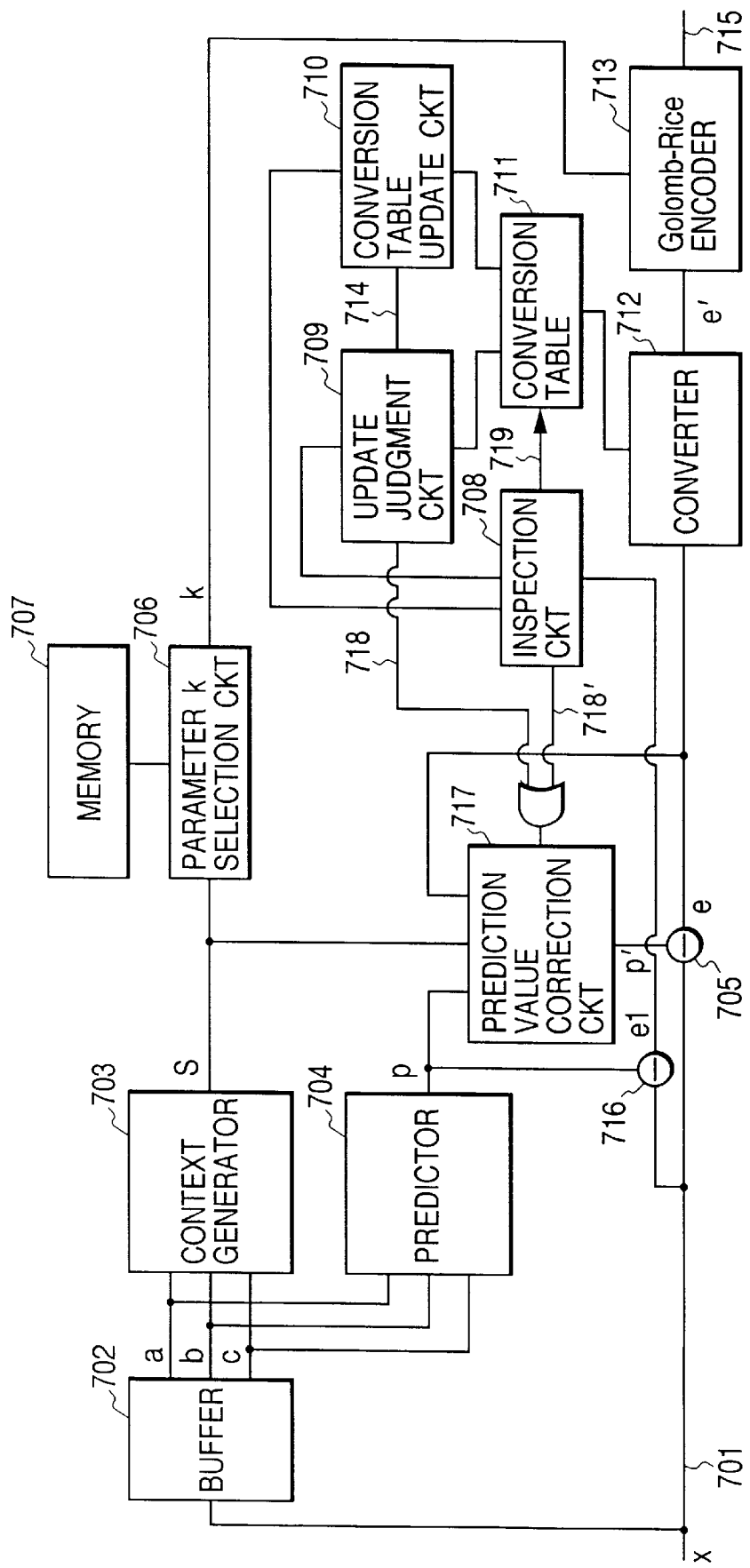
FIG. 7 is a block diagram showing an image process apparatus according to a second embodiment of the present invention.
Figure 11A:
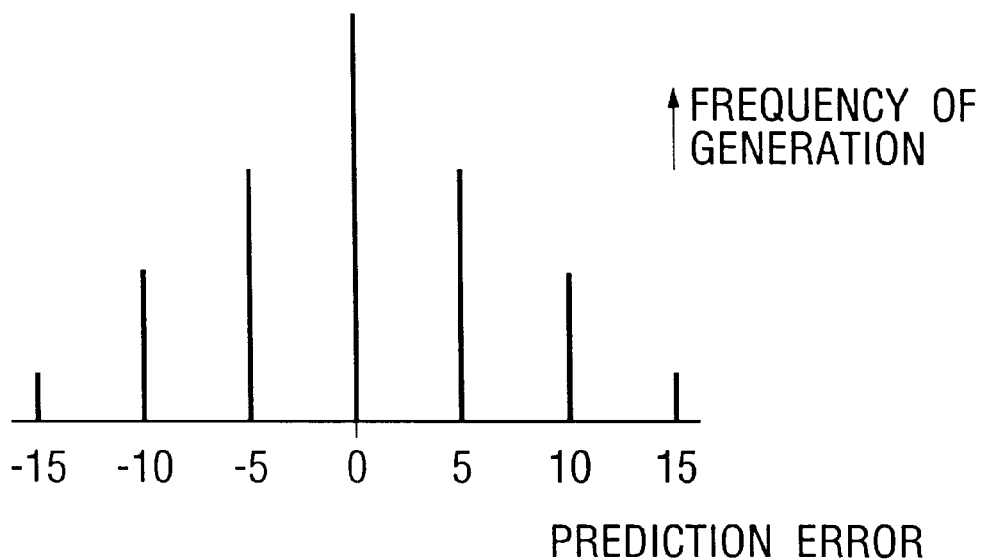
FIGS. 11A and 11B are views for explaining conventional problems.
Figure 11B:
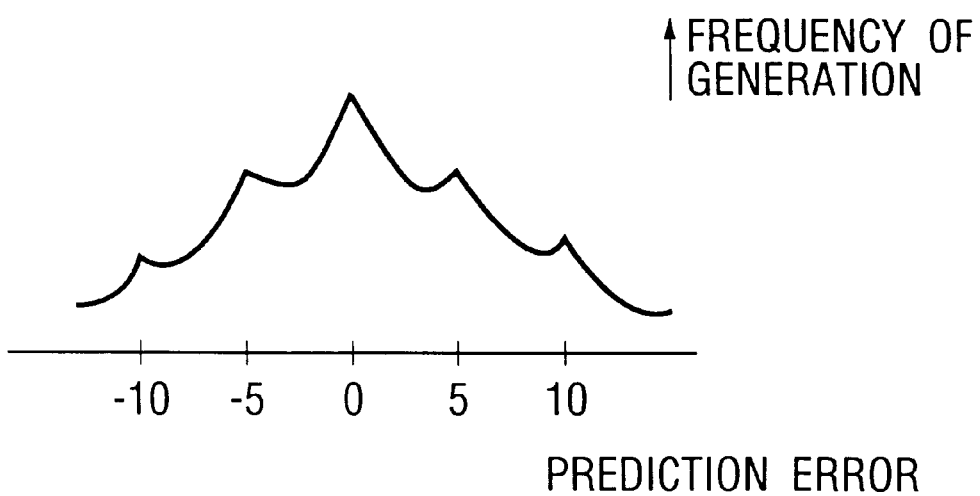

FIG. 7 is a block diagram showing the second embodiment of the present invention. In FIG. 7, reference numeral 701 denotes a signal line, 702 denotes a buffer which stores image data of two lines, 703 denotes a context generator which generates a context (i.e., a value representing a state of peripheral pixel value) from peripheral pixels, 704 denotes a predictor which generates prediction value, 705 denotes a subtracter, 706 denotes a parameter k selection circuit, 707 denotes a memory which holds a Golomb-Rice parameter k for each context, 708 denotes an inspection circuit which has therein a one-bit flag f(e) storing whether or not a prediction error e has been generated, 709 denotes an update judgment circuit which judges whether or not updated of a conversion table is to be performed, 710 denotes a conversion table update circuit, 711 denotes a memory which stores the conversion table in which output value M(i) for value i inputted to a converter 712 has been defined (to be referred as a conversion table 711 hereinafter), 712 denotes a converter which converts the prediction error in accordance with the conversion table 711, 713 denotes a Golomb-Rice encoder, 714 denotes a signal line, 715 denotes a signal line, 716 denotes a subtracter, 717 denotes a prediction value correction circuit, and 718 denotes a signal line.

Like the first embodiment, it will be explained as an example a case where an eight-bit (i.e., values "0" to "255") monochrome image is encoded.

It is assumed that the memory 707 has stored and holds value of the parameter k suitable for each context which value was obtained by previously performing an encoding test of several sample images.

FIG. 8 shows an example of a correspondence table of a context S and the parameter k stored in the memory 707.

The prediction value correction circuit 717 has therein a memory region for holding the number N(S) of generation of the prediction error e for each context S and cumulative value E(S) of the prediction error e for each context S. In an initial state, all the values have been as "0".

It is assumed that an initial state of the control signal outputted to the signal line 718 has been set as "0". Further, as the initial state, all the flags f(e) held in the inspection circuit 708 have been set as "0", and also the conversion table 711 has been set such that the output value M(i) for the input value i satisfies the following equation.

$$M(e) = \begin{cases} -2e-1 & \text{for } e < 0 \\ 2e & \text{for } e \geq 0 \end{cases}$$

Hereinafter, an operation of each unit in the present embodiment will be sequentially explained.

Initially, image data or signal representing an encoding target pixel x is inputted, in the order of raster scanning, into the buffer 702 and the subtracters 705 and 716 through the signal line 701.

The buffer 702 stores the signal of two lines inputted from the signal line 701. The predictor 704 reads the image data of peripheral pixels a, b and c of the encoding target pixel x from the buffer 702, and obtains prediction value p for the encoding target pixel x by calculating p=a+b−c. Positions of the peripheral pixels a, b and c for the encoding target pixel x are shown in FIG. 3. The context generator 703 firstly reads the peripheral pixels a, b and c of the encoding target pixel x from the buffer 702, and secondly obtains values (a−c) and (b−c). Then, the context generator 703 obtains values q(a−c) and q(b−c) by quantizing each of the two values (a−c) and (b−c) into three levels in accordance with a table shown in FIG. 9. By using such results, the context generator 703 calculates the context S=3×q(a−c)+q(b−c) to generate and output the context S="0" to "8".

The parameter k selection circuit 706 reads the value of the parameter k corresponding to the context S from the memory 707 and then outputs the read value. The subtracter 716 outputs a prediction error e1=x−p which is the difference between the prediction value p generated by the predictor 704 and the encoding target pixel value x.

In a case where a control signal from the signal line 718 is "0" and a signal from a signal line 718' is "0", the prediction value correction circuit 717 outputs the prediction value p outputted from the predictor 704, as it is, as a corrected prediction value p'.

On the other hand, in a case where the control signal from the signal line 718 is "1" or the signal from the signal line 718' is "1", the circuit 717 reads the number N(S) of generation of the prediction error e for each context S and the cumulative value E(S) of the prediction error e from its internal memory region, on the basis of the context S generated by the context generation circuit 703. Subsequently, the circuit 717 obtains a mean value merr(S) of the prediction errors in the context S by calculating E(S)/N(S). By using the mean value merr(S) and the prediction value p outputted from the predictor 704, the circuit 717 outputs the corrected prediction value p'=p+merr(S), to the subtracter 705.

The subtracter 705 obtains the prediction error e=x−p' from the corrected prediction value p' outputted by the prediction value correction circuit 717 and the encoding target pixel x, and outputs the obtained prediction error e.

Further, every time the prediction error e is generated, in a case where the control signal from the signal line 718 is "1" or the control signal from the signal line 718' is "1", the prediction value correction circuit 717 newly adds the prediction error e outputted by the subtracter 705 to the cumulative value E(S), and performs increment of the number N(S) of generation of the prediction error e for each context S to store the obtained data into the internal memory region.

The converter 712 reads an intermediate output value e' for the input value e from the conversion table 711, and then outputs the read value. The Golomb-Rice encoder 713 generates encoding data of the intermediate output value e' on the basis of a code allocation table shown in FIG. 10 which corresponds to the values of the parameter k outputted by the parameter k selection circuit 706, and outputs the obtained data through the signal line 715.

Subsequently, a detailed encoding procedure in the Golomb-Rice encoder 713 will be explained hereinafter.

Firstly, the intermediate output value e' (i.e., "0" to "510" in this case) which is the target of encoding is expressed in binary number, and then divided into a lower k-bit portion and an upper remaining portion. It is assumed that value obtained by expressing the upper remaining portion in decimal number is n. The encoding data is obtained by adding "0" to the lower k-bit portion by n, and finally adding "1". For example, FIG. 10 shows correspondence between the intermediate output value e' and the encoding data in case of k="0", "1", "2".

When a prediction error el is outputted from the subtracter 716, the inspection circuit 708 changes the flag f(el) corresponding to the prediction error el into "1".

The inspection circuit 708 checks, in the held flags f(−Th) to f(Th), the values of the flags f(−Th) to f(Th) corresponding to the prediction errors "−Th" to "Th" (where "Th" is an arbitrary integer within the range "0" to "255"), for each pixel clock.

In a case where the flags f(−Th) to f(Th) are all "1", the inspection circuit 708 outputs the control signal "1" to the signal line 718', and outputs a control signal 719 for resetting or returning the conversion table 711 to the initial state.

On the other hand, in a case where at least one of the flags f(−Th) to f(Th) is "0", the inspection circuit 708 outputs the control signal "0" to the signal line 718'.

For example, when k=2, the intermediate value e'=5 (decimal) (binary "101") is divided into a lower 2(=k) bit part "01" and an upper part "1". It is determined that the lower bit part "01" is the upper 2(=k) bit of Golomb encoding data. That is, it is determined that the encoding data is "01* . . . ". Furthermore, the code "0" of the number 1 (decimal) represented by the upper bit "1" is added on or after 3 (=k+1) bits of Golomb encoding data. That is, it is determined that the encoding data is "010* . . . ". Sequentially, the code "1" indicating the end of Golomb encoding data is added. Accordingly, it is determined that the final encoding data is "0101".

The above-described encoding process is repeatedly performed for the eight-line pixels of the input image data.

Subsequently, an operation of the update circuit will be explained in detail.

In the above-described processes, in the flags f(−Th) to f(Th) held in the inspection circuit 708, "1" has been allocated to the prediction error generated within the eight lines, and "0" has been allocated to the prediction error not generated. When the process of the eight lines terminates, the update judgment circuit 709 refers to the flag held in the inspection circuit 708. Then, in a case where "0" exists in the flags f(−Th) to f(Th) corresponding to the prediction errors "−Th" to "Th" (where "Th" is an arbitrary integer within the range "0" to "255"), during the process of the subsequent eight lines, the update judgment circuit 709 outputs the control signal "1" for operating the conversion table update circuit 710 to the signal line 714 and also outputs the control signal "0" for controlling the operation of the prediction value correction circuit 717 to the signal line 718.

On the contrary, in a case where the flags f(-Th) to f(Th) are all "1", during the process of the subsequent eight lines, the update judgment circuit 709 outputs the control signal "0" not for operating the conversion table update circuit 710 to the signal line 714 and also outputs the control signal "1" for controlling the operation of the prediction value correction circuit 717 to the signal line 718. In addition, the inspection circuit 708 and the conversion table 711 are reset or returned to the initial state.

The conversion table update circuit 710 operates in the case where the control signal from the signal line 714 is "1", to rewrite the conversion table 711.

In this case, firstly, the circuit 710 refers to the value of the flag held in the inspection circuit 708, so as to check the number Np of the prediction error which has been generated even once in the previously-encoded eight lines, within the range of the prediction errors "0" to "255". Secondly, the circuit 710 checks the value of the flag in the order of the prediction error "0", "1", "2", "3" to "255". In a case where the flag f(e) is "1" (i.e., the prediction error e is generated even once), the circuit 710 allocates even-number values of "0" to "2×Np−1" to the output value M(e) held in the conversion table 711. On the other hand, in a case where the flag f(e) is "0" (i.e., the prediction error e is not generated even once), the circuit 710 sequentially allocates the even-number values of "2×Np" to "510" to the output value M(e).

Subsequently, the circuit 710 checks the number Nm of the prediction error generated within the range of the prediction errors "−1" to "−255". Like the case where the prediction error is positive, the circuit 710 checks the flag f(e) in the order of the prediction error "−1", "−2", "−3" to "−255". If the flag f(e) is "1", the circuit 710 sequentially allocates odd-number values of "1" to "2×Nm−1" to the output value M(e) held in the conversion table 711. On the other hand, if the flag f(e) is "0", the circuit 710 sequentially allocates the odd-number values of "2×Nm+1" to "509" to the output value M(e). By such the operations, the conversion table 711 is rewritten. Therefore, the prediction error which has not been generated even once in the previously-encoded eight lines is managed, irrespective of magnitude of its value, as the large-value prediction error from the time of encoding the subsequent eight lines. For this reason, in the prediction encoding in which the short encoding code is allocated to the small prediction error, the compression efficiency can be improved. After the rewriting of the conversion table 711 terminated, the conversion table update circuit 707 initializes the inspection circuit 708.

As described above, the encoding process of the eight-line image data and the successive updating of the conversion table 711 are repeatedly performed, the encoding is continuously performed until the final encode target pixel of the image inputted from the signal line 701, whereby the encoding data is outputted to the signal line 715.

The present invention is not restricted to the above-described embodiments. For example, as a prediction method of the encoding target pixel value, pre-predicting may be simply used. On the other hand, by providing several prediction methods, these methods may be appropriately switched or exchanged.

Further, in the above-described embodiments, the Huffman encoding and the Golomb-Rice encoding are used as the encoding means, but another encoding such as arithmetic encoding or the like may be used.

As described above, according to the image encoding apparatus of the present invention, the encoding can be effectively performed even for the image data having such the discrete pixel value as seen in the CG image, the limited-color image or the like.

Especially, in the first and second embodiments, it is detected whether or not each prediction error is generated even once every time the predetermined unit of image (i.e., eight lines) is encoded. Then, on the basis of the detected result, an interpretation of the prediction error in case of encoding next time is changed, whereby the compression efficiency in the prediction encoding (i.e., variable length encoding) can be improved.

(Third Embodiment)

Figure 12:
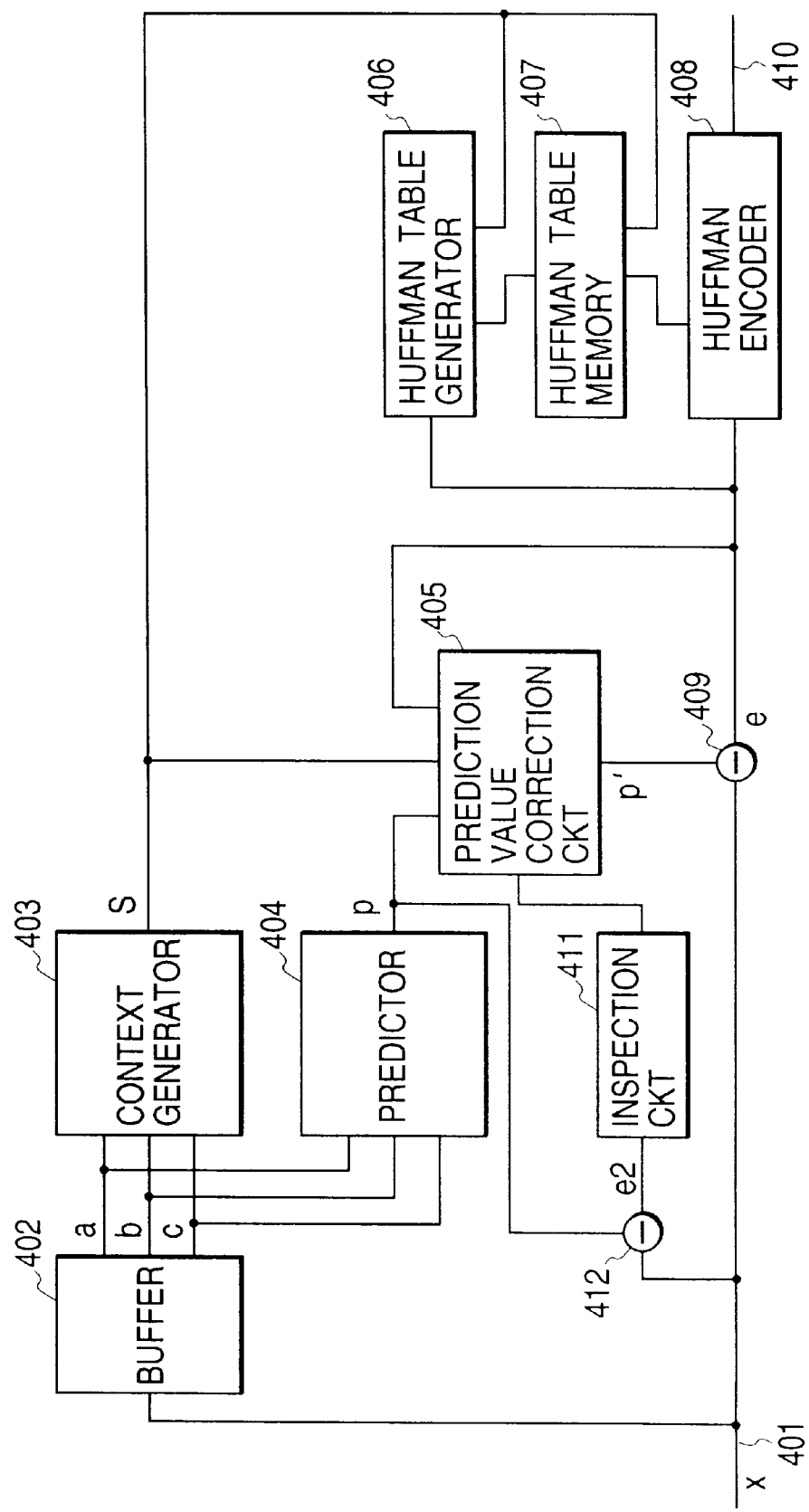
FIG. 12 is a block diagram showing an image encode apparatus according to a third embodiment of the present invention.

FIG. 12 is a block diagram showing the third embodiment of the present invention.

In FIG. 12, reference numeral 401 denotes a signal line, 402 denotes a buffer, 403 denotes a context generator, 404 denotes a predictor, 405 denotes a prediction value correction circuit, 406 denotes a Huffman table generator, 407 denotes a Huffman table memory which stores a Huffman table, 408 denotes a Huffman encoder, 409 denotes a subtracter, 410 denotes a signal line, and 411 denotes an inspection circuit which has therein a one-bit flag f(e) for storing whether or not a prediction error e has been generated.

In the present embodiment, encoding is performed based on two-path structure. That is, in a first path, the Huffman table is structed in the Huffman table memory 407, and in a second path, the practical encoding is performed by using the structured Huffman table.

It will be explained in the present embodiment a case where an eight-bit (i.e., values "0" to "255") monochrome image is encoded. Before the encoding is performed, all the flags f(e) held in the inspection circuit 411 are set as "0". Further, the prediction value correction circuit 405 has therein a memory region which holds the number N(S) of generation of the prediction error e for each context S and a cumulative value E(S) of the error for each state. However, as an initial state, all the values in the circuit 405 have been set as "0".

Firstly, image data is sequentially inputted from the signal line 401. The buffer 402 stores the image data of two lines inputted from the signal line 401. The predictor 404 reads peripheral pixels a, b and c of an encode target pixel x from the buffer 402, and produces a prediction value p by calculating p=a+b−c.

Positions of the peripheral pixels a, b and c are shown in FIG. 3. Similarly, the context generator 403 fetches the peripheral pixels a, b and c to obtain values (a−c) and (b−c). Then, like the first embodiment, the context generator 403 obtains each of values Q(a−c) and q(b−c) by quantizing each of the two values (a−c) and (b−c) into three levels in accordance with the table shown in FIG. 9. By using such the results, the context generator 403 generates the context S which represents the states of the peripheral pixels expressed by "0" to "8", by calculating S=3×q(a−c)+q(b−c).

The prediction value correction circuit 405 inputs the context S outputted by the context generator 403, and reads from the internal memory region the number N(S) of generation of the prediction error e for each context S and the cumulative value E(S) of the prediction error e for each context S.

Subsequently, the prediction value correction circuit 405 obtains a mean value merr(S) of the prediction error in the context S by calculating E(S)/N(S). Then, the inspection circuit 411 checks the value of a flag f(-merr(S)) which stands the flag "1" for the already-generated value, in a prediction error e2 between the prediction value p and the encode target pixel value x. If the flag f(−merr(S)) is "1", the prediction value correction circuit 405 adds the mean value merr(S) to the prediction value p outputted by the predictor 404, and outputs the obtained value as a corrected prediction value p'=p+merr(S). In this case, the mean value merr(S) may be controlled to have positive value.

On the other hand, if the mean value f(−merr(S)) is "0", the prediction value correction circuit 405 outputs the prediction value p as it is, as the corrected prediction value p'. The subtracter 409 obtains the prediction error e=x−p' between the encode target pixel x and the corrected prediction value p', and then outputs the obtained prediction error e.

A subtracter 412 obtains and outputs the prediction error e2 which is the difference between the encode target pixel x and the prediction value p. The inspection circuit 411 checks the flag value f(e2) corresponding to the differential value e2. Then, if the flag value f(e2) is "0", the circuit 411 rewrites it into "1".

The prediction value correction circuit 405 performs increment on the number N(S) of the prediction error e for each context S, newly adds the prediction error e generated by the subtracter 409 to the cumulative value E(S) and stores the obtained value. The Huffman table generator 406 counts the number of generation of the prediction error e for each context S which is derived from the context generator 403.

By repeatedly performing the above-described process for all the image data inputted from the signal line 401, nine frequency distributions each corresponding to each context S are generated in the internal memory of the Huffman table generator 406. In this case, the nine Huffman tables are structured respectively from these nine frequency distributions and then stored in the Huffman table memory 407.

In the second path, the nine Huffman tables stored in the memory 407 are appropriately switched and used for each context S, whereby the encoding and outputting are performed.

When the above-described process terminated, the next image data beginning from the first pixel is again sequentially inputted into the signal line 401, and the prediction error e is generated for each pixel in the same operation as that in the first path. The Huffman encoder 408 performs the Huffman encoding on the prediction error e by referring to the Huffman table corresponding to each context S stored in the Huffman table memory 407, and outputs the obtained data.

The above-described process is repeatedly performed for the entire encoding target pixels, and thus the encode data is outputted.

The present invention is not restricted to the above-described embodiments. For example, as the prediction method of the encoding target pixel value, the pre-predicting may be simply used. On the other hand, by providing the several prediction methods, these methods may be appropriately switched or exchanged.

Further, in the above-described embodiments, the Huffman encoding and the Golomb-Rice encoding are used as the encoding means, but another encoding such as the arithmetic encoding or the like may be used.

It will be obviously understood that the object of the present invention can be achieved by supplying a storage medium in which program codes of a software to realize the functions of the above-described embodiments are stored to a system or an apparatus, and reading and executing the program codes stored in the storage medium with a computer (CPU or MPU) in the system or the apparatus.

In such a case, the program codes themselves of the software read out of the storage medium realize the functions of the above-described embodiments, thus the storage medium in which the program codes have been stored construct the present invention.

As such the storage medium to store the program codes, e.g., it is possible to use a floppy disk, a hard disk, an optical disk, an optomagnetic disk, a CD-ROM, a CD-R, a magnetic tape, a non-volatile memory card, a ROM or the like can be used.

Further, it will be obviously understood that the present invention incorporates not only a case where the functions of the above-described embodiments are realized by executing the program codes read by the computer, but also a case where an OS (operating system) or the like operating in the computer performs a part or all of the actual processes on the basis of instructions of the read program codes and by such the processes the functions of the above-described embodiments are realized.

Furthermore, it will be obviously understood that the present invention also incorporates a case where the program codes read out of the storage medium are written into a memory provided for a function expansion board of the computer or a function expansion unit connected to the computer and, after that, the CPU or the like provided for the function expansion board or the function expansion unit executes a part or all of the actual processes on the basis of instructions of the program codes, and the functions of the above-described embodiments are realized by the processes.

As explained above, in the case where the image to be encoded consists of the discrete pixel values, the image encoding apparatus according to the present invention performs the controlling such that the correction of the prediction value by the prediction value correction means is not performed. Therefore, even in the case of encoding the data of the image such as the CG image, the limited-color image or the like having the discrete pixel value, the encoding can be effectively performed by utilizing bias of the prediction error.

Many modifications and variations are possible for the present invention, within the spirit and scope of the appended claims.

What is claimed is:

1. An image encoding apparatus, comprising:

generating means for generating a first prediction error difference on the basis of a first value of at least one reference pixel and a first prediction value of the reference pixel, and generating a second prediction error difference on the basis of a second value of encoding target pixel and a second prediction value of the encoding target pixel, the reference pixel being encoded before the encoding target pixel is encoded and the first prediction error difference being generated before the second prediction error difference is generated;

judging means for judging an appearing prediction error difference and an unappearing prediction error difference on the basis of the first prediction error difference, and for encoding the second prediction error difference on the basis of the judged appearing and unappearing prediction error differences, wherein the second prediction error difference is not used in the judging operation;

changing means for changing a first corresponding relationship between prediction error difference and encoding data to a second corresponding relationship between prediction error difference and encoding data according to a result obtained by said judging means; and encoding means for encoding the second prediction error difference on the basis of a selected one of the first and second corresponding relationships to obtain corresponding encoding data.

2. An apparatus according to claim 1, wherein the first and second corresponding relationships are each a respective corresponding relationship between the prediction error difference and variable length encoding data, and wherein said encoding means executes variable length encoding on the second prediction error difference.

3. An apparatus according to claim 1, wherein said encoding means encodes the first prediction error difference before encoding the second prediction error difference.

4. An apparatus according to claim 1, wherein said encoding means executes Huffman coding.

5. An apparatus according to claim 1, wherein said encoding means executes Golomb-Rice encoding.

6. An apparatus according to claim 1, further comprising prediction means for generating the second prediction value of the encoding target pixel on the basis of a peripheral pixel of the encoding target pixel.

7. An image encoding method, comprising the steps of:

generating a first prediction error difference on the basis of a first value of at least one reference pixel and a first prediction value of the reference pixel, and generating a second prediction error difference on the basis of a second value of an encoding target pixel and a second prediction value of the encoding target pixel, the reference pixel being encoded before the encoding target pixel is encoded and the first prediction error difference being generated before the second prediction error difference is generated;

judging an appearing prediction error difference and an unappearing prediction error difference on the basis of the first prediction error difference, and for encoding the second prediction error difference on the basis of the judged appearing and unappearing prediction error differences, wherein the second prediction error difference is not used in the judging operation;

changing a first relationship between prediction error difference and encoding data to a second corresponding relationship between prediction error difference and encoding data according to a result obtained in said judging step; and encoding the second prediction error difference on the basis of a selected one of the first and second corresponding relationships to obtain corresponding encoding data.

8. A computer readable storage medium that stores program codes for executing an image encoding method, said method comprising the steps of:

generating a first prediction error difference on the basis of a first value of at least one reference pixel and a first prediction value of the reference pixel, and generating a second prediction error difference on the basis of a second value of encoding target pixel and a second prediction value of the encoding target pixel, the reference pixel being encoded before the encoding target pixel is encoded and the first prediction error difference being generated before the second prediction error difference is generated;

judging an appearing prediction error difference and an unappearing prediction error difference on the basis of the first prediction error difference, and for encoding the second prediction error difference on the basis of the judged appearing and unappearing prediction error differences, wherein the second prediction error difference is not used in the judging operation;

changing a first relationship between prediction error difference and encoding data to a second corresponding relationship between prediction error difference and encoding data according to a result obtained in said judging step; and encoding the second prediction error difference on the basis of a selected one of the first and second corresponding relationships to obtain corresponding encoding data.

9. An image encoding apparatus comprising:

generating means for generating a prediction value of an encoding target pixel;

prediction value correcting means for correcting the prediction value;

judging means for judging whether or not each of pixels of a reference area is represented by part of one of a plurality of total available values, wherein the encoding target pixel is not involved in the judging operation, and each pixel of the reference area is encoded before the encoding target pixel is encoded; and control means for controlling the correcting operation by said prediction value correcting means in accordance with a result by said judging means.

10. An apparatus according to claim 9, wherein said control means controls said prediction value correcting means to leave the prediction value unchanged when each reference pixel is represented by the part.

11. An apparatus according to claim 9, further comprising entropy encoding means for generating a prediction error difference on the basis of a value of the encoding target pixel and a prediction value generated by said generating means, said entropy encoding means encoding the prediction error difference.

12. An image encoding method comprising the steps of:

generating a prediction value of an encoding target pixel;

correcting the prediction value;

judging whether or not each of pixels of a reference area is represented by a part of one of a plurality of total available values, wherein the encoding target pixel is not involved in the judging operation, and each pixel of the reference area is encoded before the encoding target pixel is encoded; and controlling the correcting operation in said correcting step in accordance with a result in said judging step.

13. A computer readable storage medium that stores program codes for executing an image encoding method, said method comprising the steps of:

generating a prediction value of an encoding target pixel;

correcting the prediction value;

judging whether or not each of pixels of a reference area is represented by part of one of a plurality of total available values, wherein the encoding target pixel is not involved in the judging operation, and each pixel of the reference area is encoded before the encoding target pixel is encoded; and controlling the correcting operation in said correcting step in accordance with a result in said judging step.

* * * * *